J. C. MILLER.
FAN BRACKET AND BELT TIGHTENER.
APPLICATION FILED JUNE 1, 1918.

1,311,527. Patented July 29, 1919.

Inventor
J.C. Miller.
By Lancaster & Allwine
his Attorneys

UNITED STATES PATENT OFFICE.

JOSEPH C. MILLER, OF ST. PAUL, MINNESOTA, ASSIGNOR OF ONE-HALF TO JOHN O'BRIEN, OF ST. PAUL, MINNESOTA.

FAN-BRACKET AND BELT-TIGHTENER.

1,311,527. Specification of Letters Patent. Patented July 29, 1919.

Application filed June 1, 1918. Serial No. 237,814.

*To all whom it may concern:*

Be it known that I, JOSEPH C. MILLER, a citizen of the United States, and a resident of St. Paul, in the county of Ramsey and State of Minnesota, have invented certain new and useful Improvements in Fan-Brackets and Belt-Tighteners, of which the following is a specification.

This invention relates to a fan bracket and belt tightener particularly designed for use in connection with various types of motor vehicles.

In the manufacture of certain automobiles or motor vehicles no provision is made to maintain a uniform tension on the belt which drives the engine and radiator cooling fan, so as to prevent the belt from slipping when it stretches, gets wet or becomes saturated with oil. The slipping of the belt frequently results in the overheating of the engine or motor of the motor vehicle, and various other troubles due to the lack of proper air circulation within the hood or cowl of the vehicle and it is the primary object of this invention to provide a belt tension or tightener which will maintain the belt of the cooling fan taut at all times.

A further object of the invention is to provide a bracket structure for detachable connection with the motor or engine bracket, to which bracket arm is pivotally connected an arm that carries the shaft upon which the fan is mounted, to provide means for yieldably supporting the fan in such position as to hold its driving belt taut at all times and further to provide means for regulating the amplitude of movement of the fan shaft supporting bracket.

Other objects of the invention will appear in the following detailed description taken in connection with the accompanying drawing, forming a part of this specification, and in which drawing.

Figure 1:
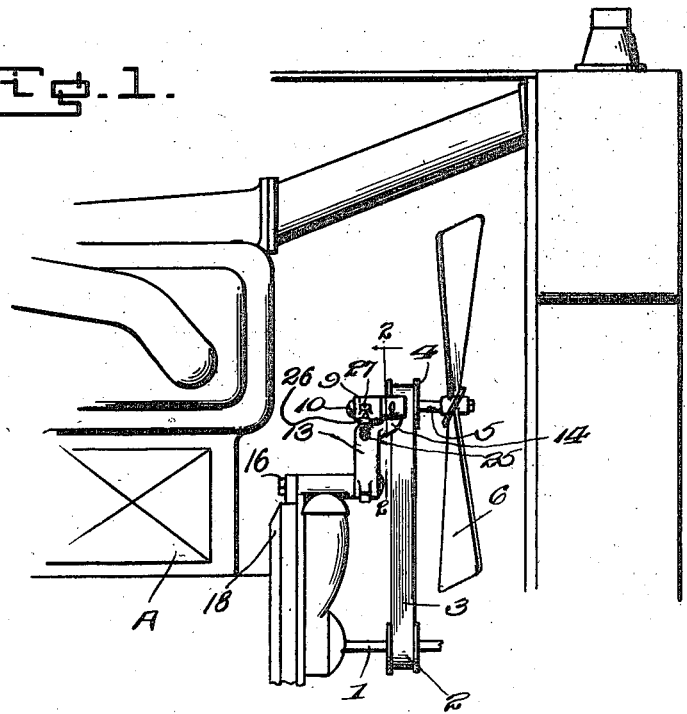
Figure 1 is a fragmentary view of a motor vehicle showing the improved bracket applied thereto.

Referring more particularly to the drawing, A indicates an ordinary motor vehicle propelling engine or motor which includes an operated or rotated shaft 1. The shaft 1 has a grooved pulley 2 mounted thereon about which a belt 3 travels. The belt 3 also travels about a grooved pulley 4 upon the shaft 5 which carries the cooling fan 6 of the engine construction.

This invention comprehends the provision of a yieldable support for the shaft 5 to maintain the proper tension of the belt 3 to insure the rotation of the shaft 5 and fan 6 at all times during various changes in the condition of the belt, due to atmospherical conditions, surrounding the belt, or in case the belt becomes saturated with oil or any other liquid.

The shaft 5 is rotatably supported by a bearing 7 which is formed upon the outer end of an arm 8. The arm 8 is provided with a bearing 9 at its inner end through which the supporting and connecting pin 10 extends for pivotally connecting the arm 8 to the bracket structure 11. A cotter pin 12' may be inserted through the pin 10 and the bearing 12 formed upon the upper end of the bracket 11, to prevent rotation of the pin within the bearings 9 and 12.

The bracket 11 comprises a main body 13, having the laterally offset arm 14 formed thereon upon the upper end of which is formed the bearing 12 which alines with the bearing 9 formed upon the inner end of the arm 8. The body 13 of the bracket 11 is provided with a transversely extending opening 15 at its lower end, through which a bolt 16 extends. The bolt 16 is adapted to connect the body 13 to the engine structure A.

Figure 2:
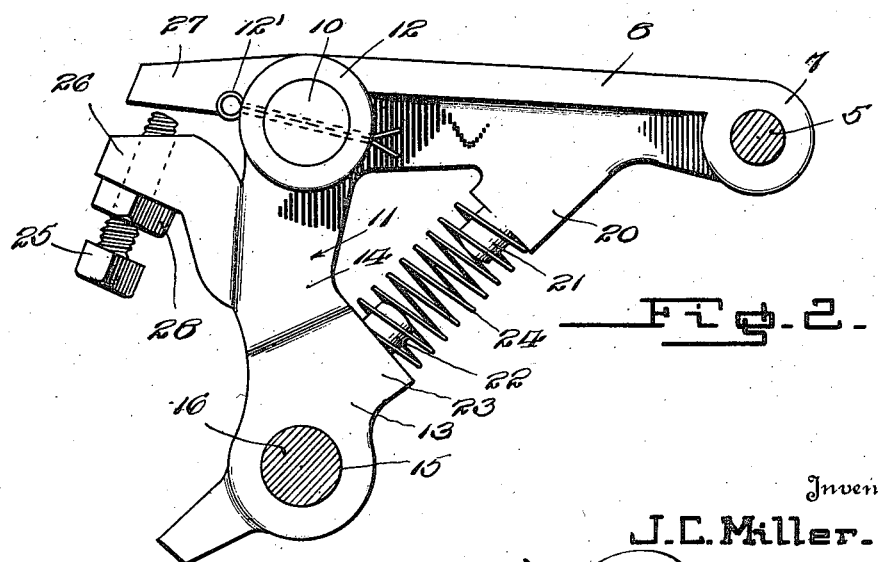
Fig. 2 is a section on the line 2—2 of Fig. 1.

The arm 8 is provided with an angularly disposed depending boss 20 having a pin or stud 21 formed upon its under end which alines with a corresponding pin or stud 22 formed upon a projection 23 formed upon the body 11. An expansible spiral spring 24 is positioned between the bosses 20 and 23, having its ends coiled about the studs 21 and 22 and this spring normally urges the arm 8 upwardly, for stretching the belt 3 to maintain the latter taut at all times. The amplitude of the pivotal movement of the arm 8 is regulated by the adjustment of a set screw 25 which is carried by a laterally extending extension 26' formed upon the bracket 11 and engages against an extension 27 formed upon the arm 8 and projecting oppositely from the pivotal axis of the arm to the end thereof which carries the shaft 5 as clearly shown in Fig. 2 of the drawing. A suitable lock nut 28 is mounted upon the set screw 25 and engages against the extension 26 for locking the set screw in adjusted position.

The bracket 11 is attached to the ordinary motor casing 18 by the bolt 16 which maintains the bracket 11 rigidly in position for pivotally supporting the arm 8 which arm is urged to its outward limit of pivotal movement by the spring 24, which limit is regulated by the adjustment of the set screw 25 and in case the belt 3 stretches, the spring, urging the shaft 5 away from the shaft 1 will hold the belt taut and cause it to fit properly about the pulleys 2 and 4 for rotating the shaft 5 by the rotation of the shaft 1. The tension of the spring 24 is such that the shrinking or contracting of the belt 5 will tension or compress the spring allowing the shaft 5 to be moved toward the shaft 1 a distance proportionate to the shrinkage of the belt.

From the foregoing description and the drawing, it will be seen that an adjustable support for the fan shaft of the cooling fan structure of the motor vehicle has been provided which will yieldably support the fan shaft for movement within certain limits, under stretching or shrinking of the drive belt of the fan shaft, maintaining a proper operative connection between the fan shaft and its operating shaft at all times and under all conditions.

Having fully described the invention, what is claimed is:

1. The combination with a cooling fan of a motor vehicle, a supporting shaft therefor, and a belt for rotating said shaft, of a rigid bracket, an arm pivotally carried by said bracket and rotatably supporting said shaft, a spring engaging said bracket and arm for normally urging the arm in a belt stretching position, an extension formed upon said arm, a set screw carried by said bracket and engaging said extension to limit the pivotal movement of the arm.

2. In a belt tightener, a rigid bracket, a shaft carrying arm pivotally carried by said bracket, an extension spring engaging said bracket and said arm for normally urging the arm away from the bracket and into a belt tightening position, and means adjustably carried by said bracket for engagement with the arm to limit the movement of the arm under action of said spring.

JOSEPH C. MILLER.